United States Patent
Sugiyama

(10) Patent No.: US 8,954,720 B2
(45) Date of Patent: Feb. 10, 2015

(54) IC CHIP, INFORMATION PROCESSING APPARATUS, SOFTWARE MODULE CONTROL METHOD, INFORMATION PROCESSING SYSTEM, INFORMATION PROCESSING METHOD, AND PROGRAM

(75) Inventor: Hirokazu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 13/062,411

(22) PCT Filed: Sep. 11, 2009

(86) PCT No.: PCT/JP2009/065891
§ 371 (c)(1),
(2), (4) Date: Apr. 11, 2011

(87) PCT Pub. No.: WO2010/029988
PCT Pub. Date: Mar. 18, 2010

(65) Prior Publication Data
US 2011/0191575 A1  Aug. 4, 2011

(30) Foreign Application Priority Data

Sep. 12, 2008  (JP) .................................. 2008-235287

(51) Int. Cl.
*G06F 9/46* (2006.01)
*G06F 1/24* (2006.01)
(Continued)

(52) U.S. Cl.
CPC ........ *G06F 21/629* (2013.01); *G06K 19/07766* (2013.01); *G06F 21/77* (2013.01); *G06F 2221/2103* (2013.01); *G06F 2221/2147* (2013.01); *G06F 2221/2153* (2013.01);
(Continued)

(58) Field of Classification Search
None
See application file for complete search history.

(56) References Cited

U.S. PATENT DOCUMENTS

2007/0272752 A1* 11/2007 Nakatsugawa et al. ........ 235/451
2009/0247077 A1* 10/2009 Sklovsky et al. ............. 455/41.1
2009/0261172 A1* 10/2009 Kumar et al. .................. 235/492

FOREIGN PATENT DOCUMENTS

| | | |
|---|---|---|
| JP | 2004-264921 | 9/2004 |
| JP | 2005-275546 | 10/2005 |
| JP | 2007-034987 | 2/2007 |

OTHER PUBLICATIONS

Michiko Sawara, Toshi Koya Yu no IC Card Kenkyukai 174, Card Wave, Sep. 20, 2005, vol. 18, No. 10, pp. 54-56.
(Continued)

*Primary Examiner* — Andrew Nalven
*Assistant Examiner* — Christopher Ruprecht
(74) *Attorney, Agent, or Firm* — K&L Gates LLP

(57) ABSTRACT

An IC chip, an information processing apparatus, a software module control method, an information processing system, an information processing method, and a program for allowing a plurality of software modules to ensure their respective security when operating are provided. An information processing system is provided to include a reader/writer and a portable communication terminal accessed by the reader/writer through near-field communication. In the portable communication terminal, a memory access management module stores a map regarding a plurality of software modules J and F for handling information exchanged in accordance with different noncontact communication principles while managing the software modules J and F based on the map. Another software module A performs mapping of the map for permitting or inhibiting the operations of the plurality of software modules.

20 Claims, 8 Drawing Sheets

(51) Int. Cl.
G06F 21/62 (2013.01)
G06K 19/077 (2006.01)
G06F 21/77 (2013.01)
H04W 4/02 (2009.01)
H04L 29/08 (2006.01)

(52) U.S. Cl.
CPC ................ H04W4/02 (2013.01); H04L 67/04 (2013.01); H04L 67/18 (2013.01)

USPC .............................................. 713/2; 718/102

(56) References Cited

OTHER PUBLICATIONS

International Search Report dated Oct. 15, 2009, for corresponding Patent Application PCT/JP2009/065891.

* cited by examiner

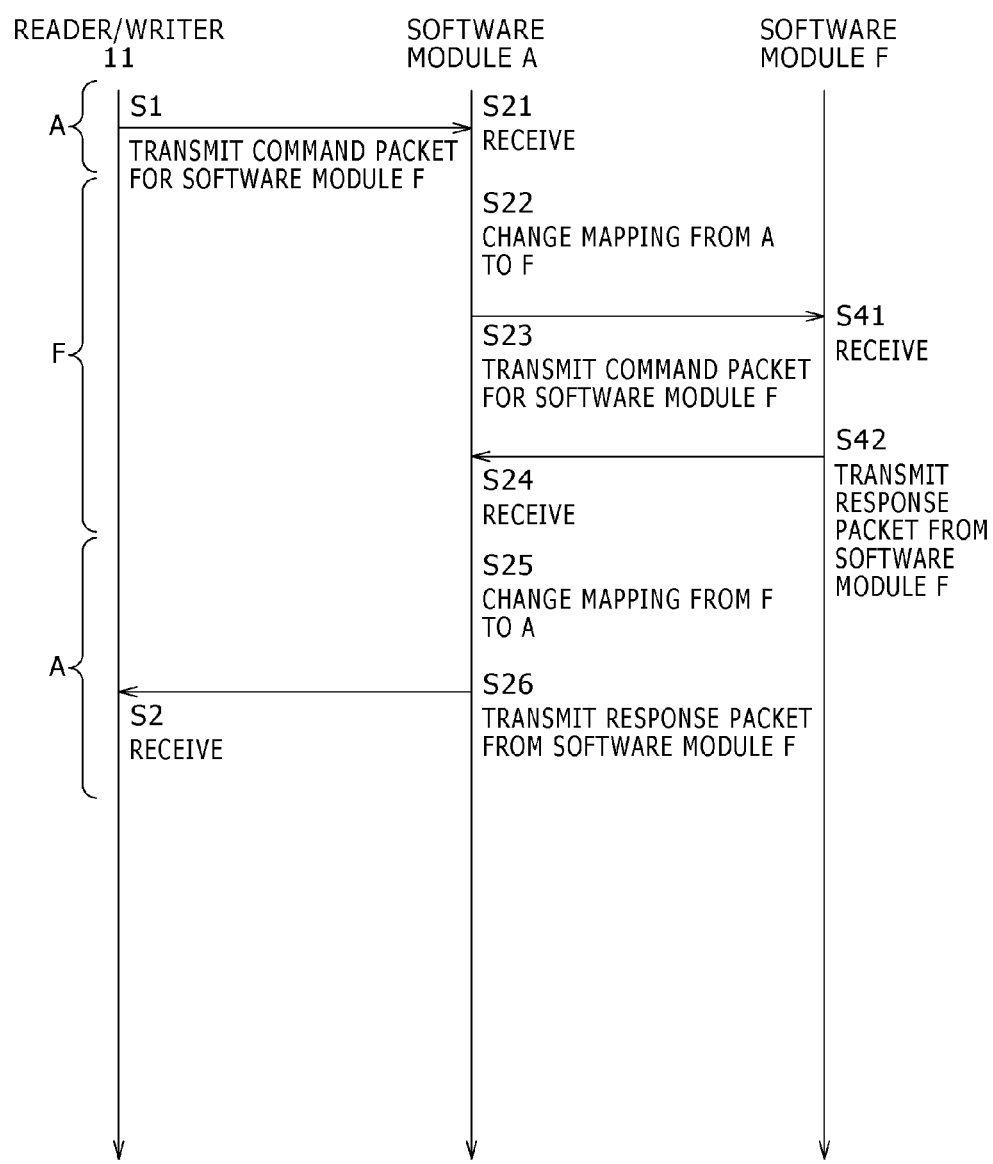

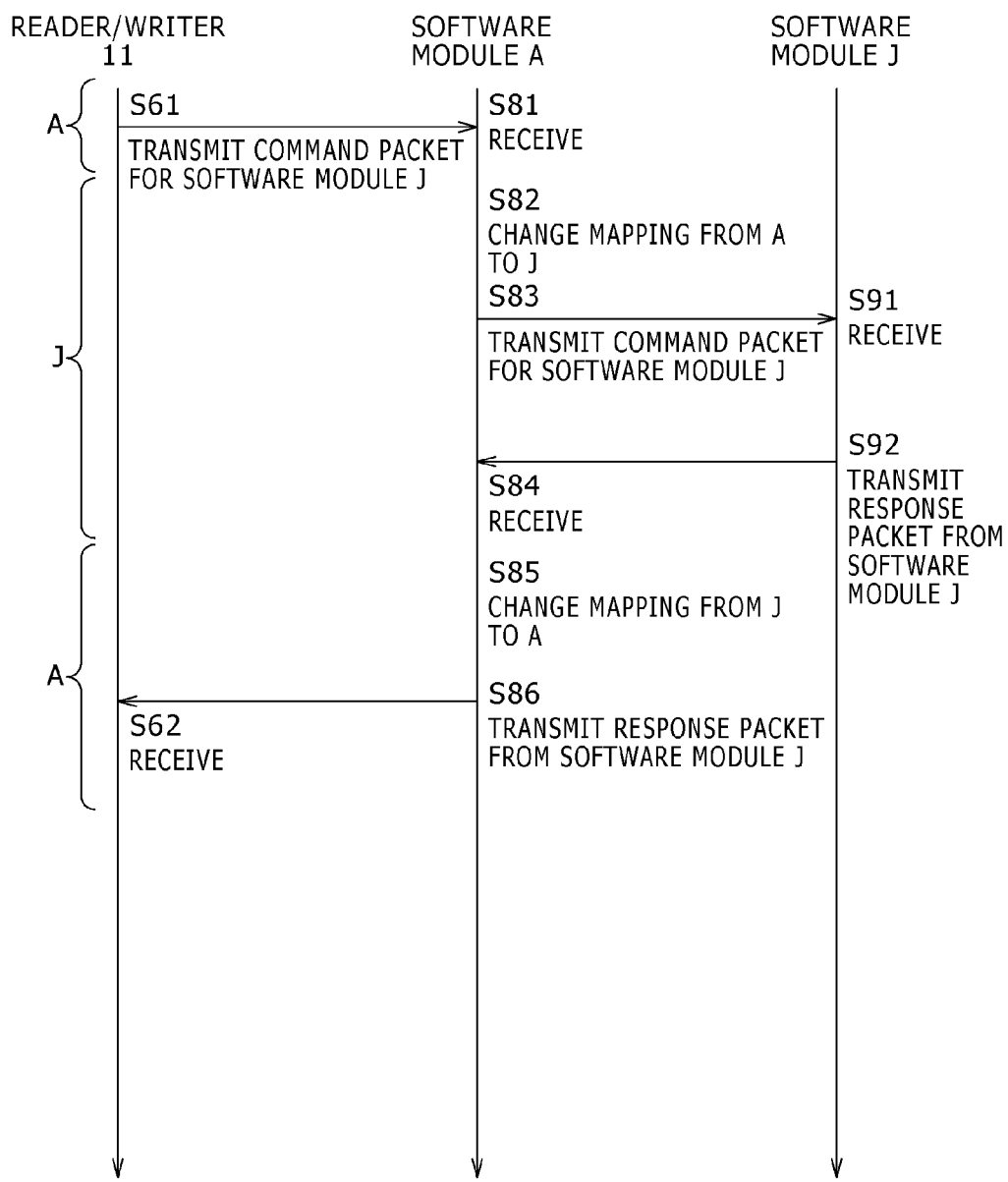

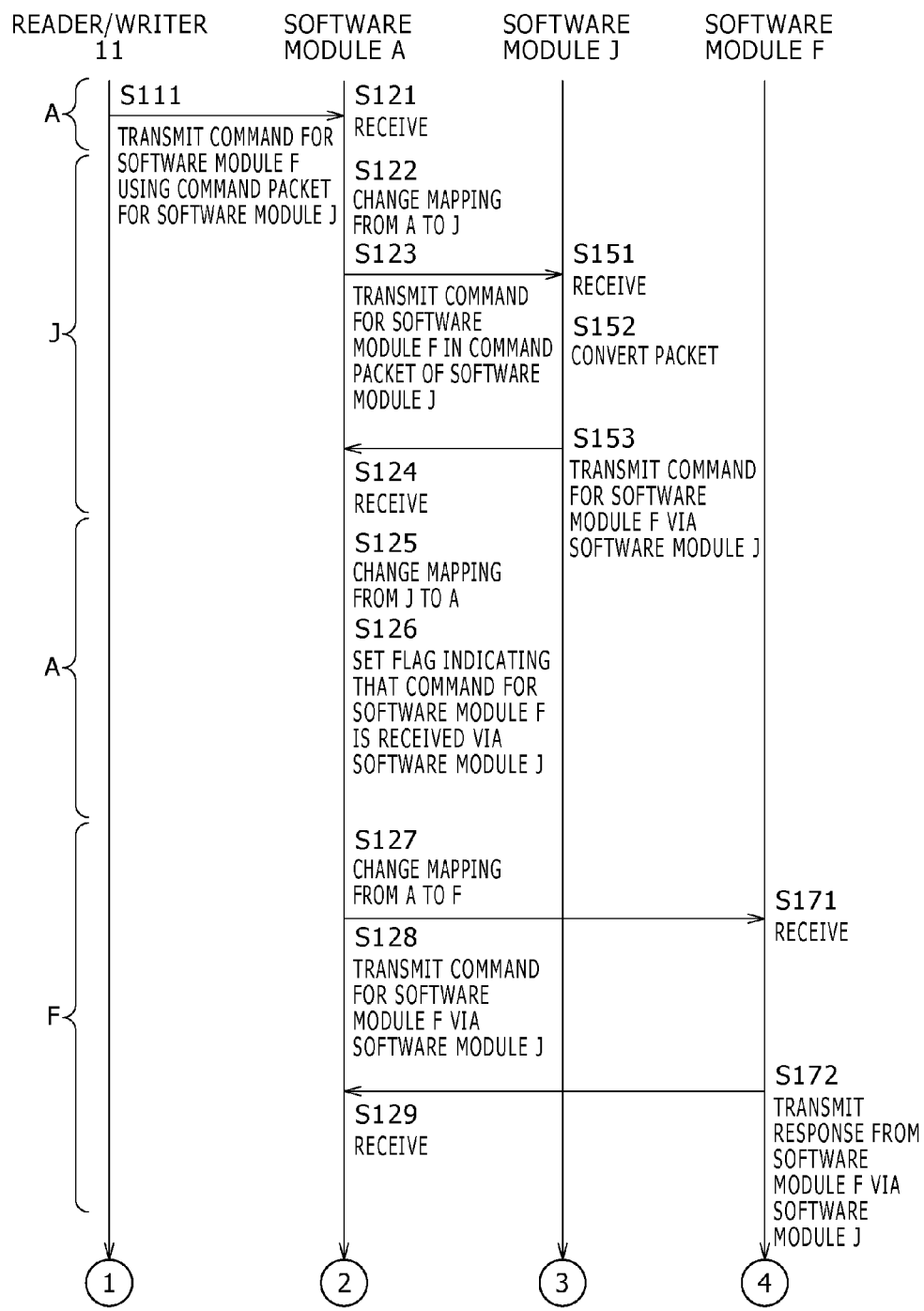

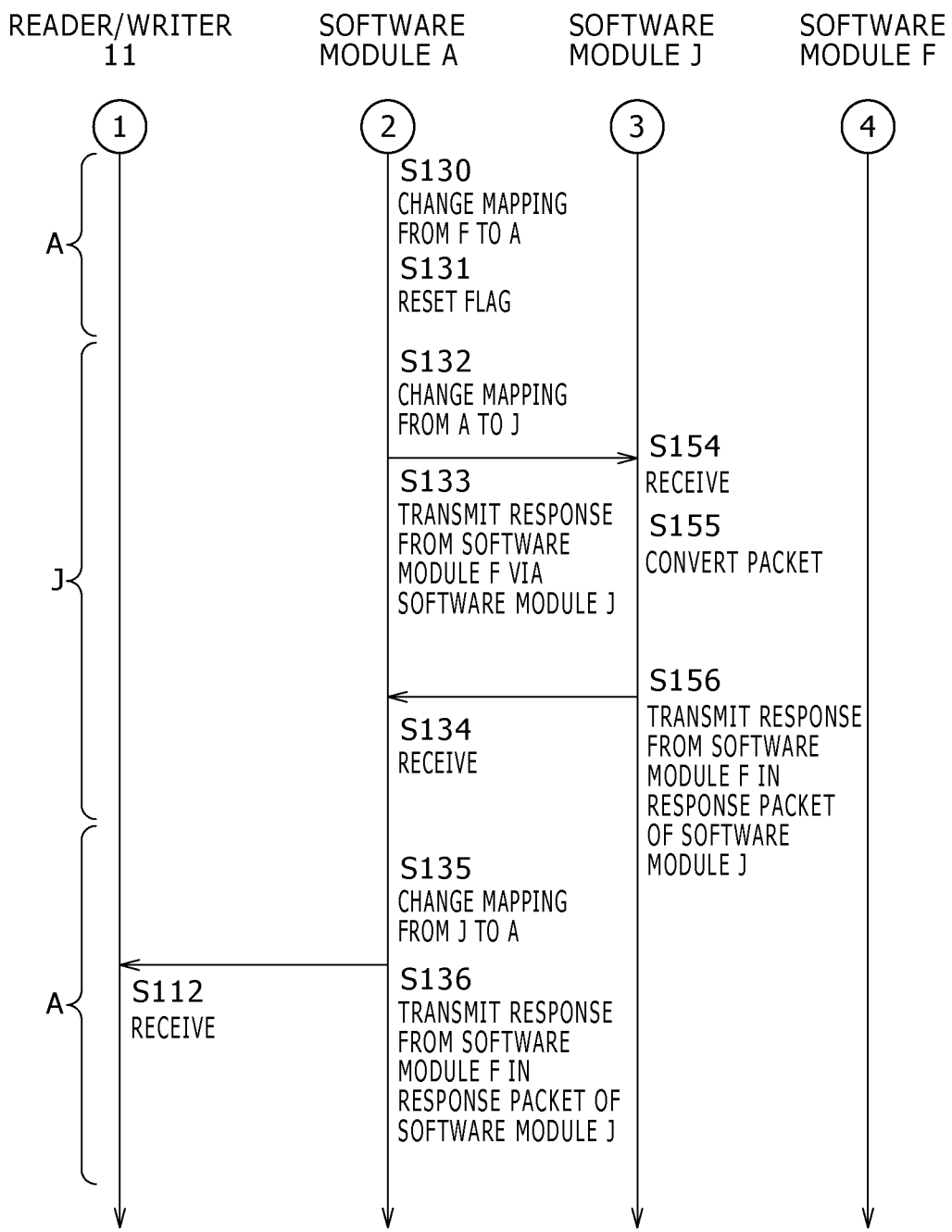

IC CHIP, INFORMATION PROCESSING APPARATUS, SOFTWARE MODULE CONTROL METHOD, INFORMATION PROCESSING SYSTEM, INFORMATION PROCESSING METHOD, AND PROGRAM

CROSS REFERENCE TO RELATED APPLICATIONS

The present application is a National Stage of International Application No. PCT/JP2009/065891 filed on Sep. 11, 2009 and which claims priority to Japanese Patent Application No. 2008-235287 filed on Sep. 12, 2008, the entire contents of which are being incorporated herein by reference.

BACKGROUND

The present disclosure relates to an IC chip, an information processing apparatus, a software module control method, an information processing system, an information processing method, and a program. More particularly, the invention relates to an IC chip, an information processing apparatus, a software module control method, an information processing system, an information processing method, and a program for allowing a plurality of software modules to ensure their respective security when operating.

This applicant proposed previously a communication system for a noncontact IC card operating on a plurality of principles involving different specifications regarding command systems, security algorithms and others (e.g., Japanese Patent Laid-Open No. 2004-264921).

According to the above proposal, a command exchanged with an IC card and the result of a response to that command are enveloped in a command called a through command that is independent of the IC card type. The process involved is performed not by a reader/writer but by a controller module disposed downstream of the reader/writer. The controller module has software modules for dealing with IC cards operating on the different principles.

However, although the previously proposed communication system handles noncontact IC cards operating on a plurality of different principles using a single reader/writer, the communication system is not designed to address a single noncontact IC cards operating on a plurality of different principles.

SUMMARY

Where a single noncontact IC card is used as an IC card operating on a plurality of different principles, that noncontact IC card should possess software modules for addressing the respective principles. These software modules are each assumed to operate individually at different timings. Two or more software modules are not supposed to operate for use at any one point in time, i.e., at the same timing, from a user's point of view.

As a result, if the card is given a command to operate on different principles at the same timing, it is difficult for the card to ensure security when operating.

The present embodiment provides arrangements for allowing a plurality of software modules to ensure their security when operating.

According to an embodiment, there is provided an IC chip including: a storage section storing map information about a plurality of software modules for processing information exchanged in accordance with different noncontact communication principles; a management section managing the operations of the software modules based on the map information; and another software module performing mapping of the map information for permitting or inhibiting the operations of the plurality of software modules.

According to another embodiment, there is provided an information processing apparatus including: a storage section storing map information about a plurality of software modules for processing information exchanged in accordance with different noncontact communication principles; a management section managing the operations of the software modules based on the map information; and another software module performing mapping of the map information for permitting or inhibiting the operations of the plurality of software modules.

According to a another embodiment, there is provided an information processing system including a first information processing apparatus, and a second information processing apparatus accessed by the first information processing apparatus through near-field communication; wherein the second information processing apparatus includes a storage section storing map information about a plurality of software modules for processing information exchanged in accordance with different noncontact communication principles; a management section managing the operations of the software modules based on the map information; and another software module performing mapping of the map information for permitting or inhibiting the operations of the plurality of software modules.

According to an embodiment, the storage section stores map information about a plurality of software modules for processing information exchanged in accordance with different noncontact communication principles; the management section manages the operations of the software modules based on the map information; and another software module performs mapping of the map information for permitting or inhibiting the operations of the plurality of software modules.

According to another embodiment, the first information processing apparatus and the second information processing apparatus accessed by the first information processing apparatus through near-field communication are provided. In the second information processing apparatus, the storage section stores map information about a plurality of software modules for processing information exchanged in accordance with different noncontact communication principles; the management section manages the operations of the software modules based on the map information; and another software module performs mapping of the map information for permitting or inhibiting the operations of the plurality of software modules.

According to the above-outlined embodiments, a plurality of software modules are allowed to ensure their respective security when operating.

Additional features and advantages are described herein, and will be apparent from, the following Detailed Description and the figures.

BRIEF DESCRIPTION OF THE FIGURES

FIG. 5 is a flowchart explanatory of the processes performed when a reader/writer gains access to a software module F.

FIG. 6 is a flowchart explanatory of the processes performed when the reader/writer gains access to a software module J.

FIG. 7 is a flowchart explanatory of the processes performed when the reader/writer communicates with the software module F via the software module J.

FIG. 8 is another flowchart explanatory of the processes performed when the reader/writer communicates with the software module F via the software module J.

DETAILED DESCRIPTION

An embodiment will now be explained. The explanation will be given under the following headings:
<1. First embodiment>
[System configuration]
[Memory map structure]
[Functional structure of the software module A]
[Mapping state transitions]
[Processes performed when the software module F is accessed]
[Processes performed when the software module J is accessed]
[Processes performed when the software module F and the software module J are started]
[System Configuration]

Figure 1:
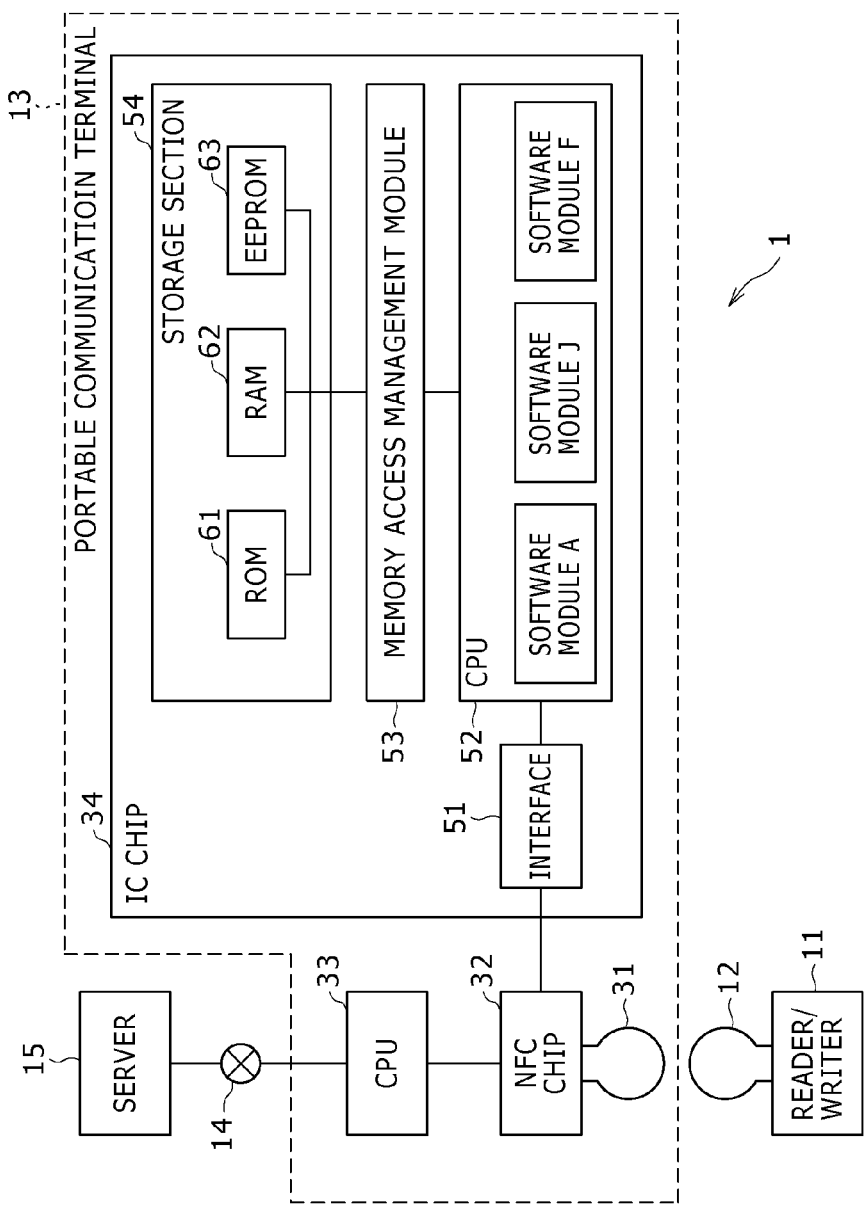
FIG. 1 is a block diagram showing a configuration of an information processing system as an embodiment.

FIG. 1 is a block diagram showing a configuration of an information processing system as an embodiment. The information processing system 1 is made up of a reader/writer 11 having an antenna 12, a portable communication terminal 13, and a server 15. The portable communication terminal 13 may be connected to the server 15 via a portable terminal communication network 14. That is, with this embodiment, it is the reader/writer 11 and server 15 that can access the portable communication terminal 13.

The portable communication terminal 13 includes an IC chip 34 composed of an antenna 31, an NFC (Near Field Communication) chip 32, a CPU (Central Processing Unit) 33, an LSI (Large Scale Integration), etc.

The NFC chip 32 and reader/writer 11 conduct noncontact communication exemplified by NFC therebetween using their respective antennas 31 and 12. The CPU 33 controls the operation of the portable communication terminal 13.

The IC chip 34 is made up of an interface 51, a CPU 52, a memory access management module 53, and a storage section 54. The storage section 54 is constituted by a ROM (Read Only Memory) 61, a RAM (Random Access Memory) 62, and an EEPROM (Electrically Erasable and Programmable Read Only Memory) 63.

The interface 51 performs interface processing between the NFC chip 32 and the CPU 52. The CPU 52 carries out various processes based on a software module A, a software module J and a software module F that have been installed.

The software module J is an operating system that handles the processing of a noncontact IC card operating on a first principle, such as Java Card (registered trademark of Sun Microsystems, Inc.). The software module F is an operating system that deals with the processing of a noncontact IC card operating on a second principle, such as FeliCa (registered trademark of Sony Corporation). The software module A serves as a mapping section that performs mapping of a memory map and arbitrates timings so that the software module F and the software module J will not operate simultaneously.

That is, the software module A performs mapping in such a manner that, of a plurality of software modules (e.g., software module F and software module J), those modules (e.g., software module J) other than the established software module (e.g., software module F) are inhibited from operating at the same timing as the established software module (e.g., software module F).

The ROM in the storage section 54 stores programs, parameters, and other information. The RAM 62 temporarily stores information. The EEPROM 63 stores information that needs to be retained after power is turned off.

The memory access management module 53 serving as a management section that manages the operations of the software modules in a map-based manner controls access from the CPU 52 to the storage section 54 on the basis of a retained memory map. If an attempt is made to access those regions on which the operations are inhibited by the memory map that is a map of the information stored in the storage section 54, i.e., if the software modules whose operations are inhibited are operated, then the memory access management module 53 performs hardware reset.

[Memory Map Structure]

Figure 2:
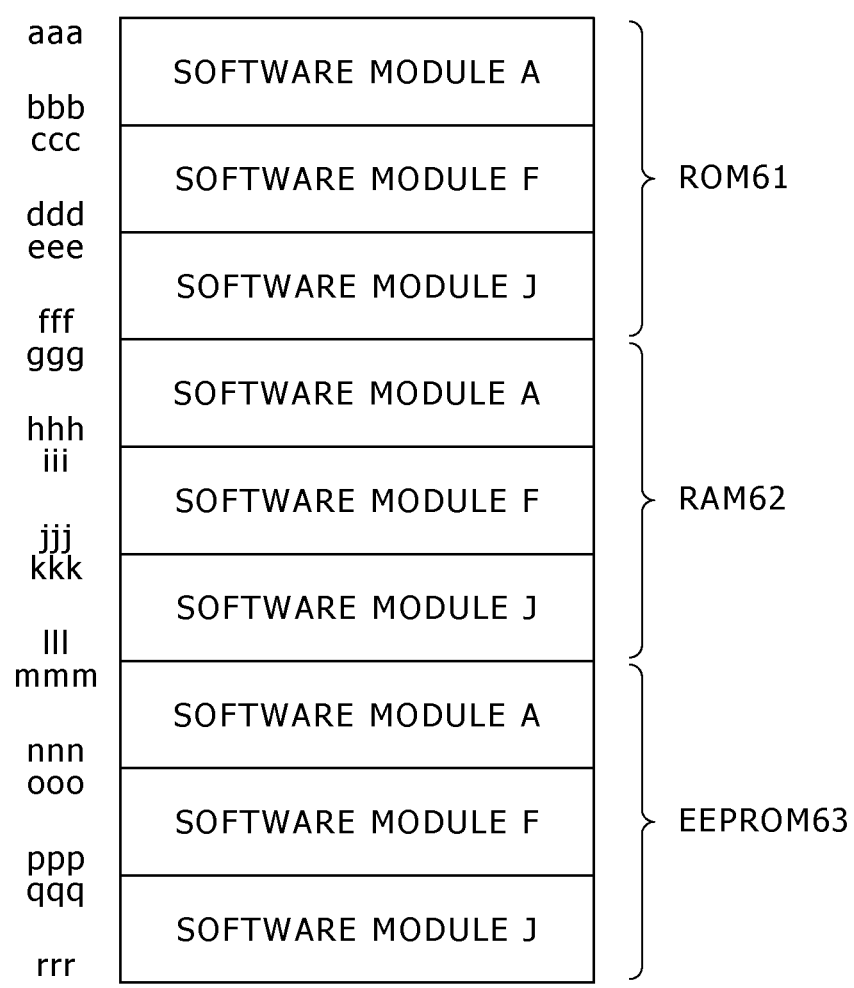
FIG. 2 is a schematic view showing a fundamental structure of a memory map.

FIG. 2 shows a fundamental structure of a memory map constituting the map that permits or inhibits the operations of the software modules. In a region between address "aaa" and address "bbb," information about the software module A in the ROM 61 is stored. In a region between address "ccc" and address "ddd," information about the software module F in the ROM 61 is stored. In a region between address "eee" and address "fff," information about the software module J in the ROM 61 is stored.

In a region between address "ggg" and address "hhh," information about the software module A in the RAM 62 is stored. In a region between address "iii" and address "jjj," information about the software module F in the RAM 62 is stored. In a region between address "kkk" and address "lll," information about the software J in the RAM 62 is stored.

In a region between address "mmm" and address "nnn," information about the software module A in the EEPROM 63 is stored. In a region between address "ooo" and address "ppp," information about the software module F in the EEPROM 63 is stored. In a region between address "qqq" and address "rrr," information about the software module J in the EEPROM 63 is stored.

[Functional Structure of the Software Module A]

Figure 3:
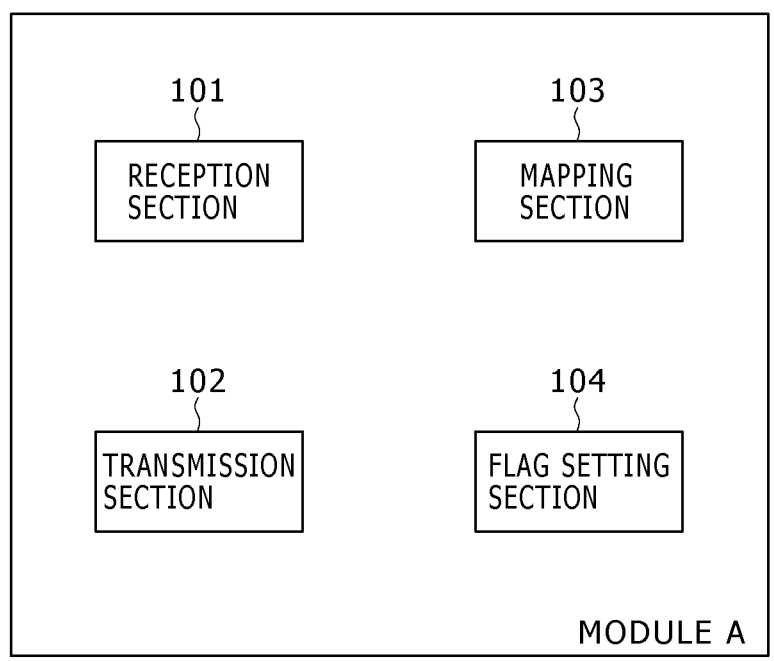
FIG. 3 is a block diagram showing a structure of a software module A.

FIG. 3 shows a functional structure of the software module A. The software module A includes a reception section 101, a transmission section 102, a mapping section 103, and a flag setting section 104.

The reception section 101 receives information from the other software modules. The transmission section 102 transmits information to the other software modules. The mapping section 103 performs mapping of a memory map. The flag setting section 104 sets flags.

[Mapping State Transitions]

Figure 4:
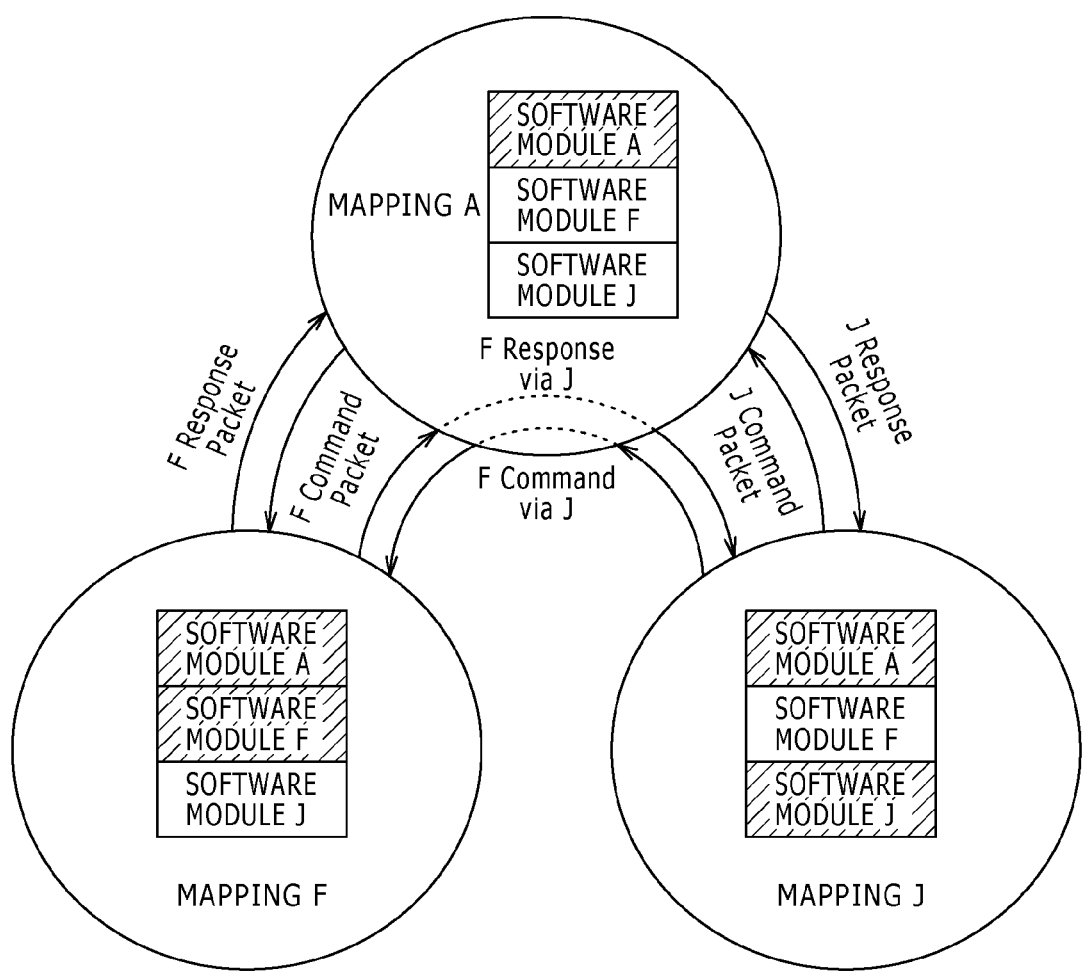
FIG. 4 is a state transition diagram showing transitions between mappings.

FIG. 4 shows transitions between mapping states. In the case of this embodiment, three states exist: mapping A, mapping F, and mapping J. The mapping A permits only the software module A to operate while inhibiting the operations of the software module F and the software module J. The mapping F permits only the software module A and the software module F to operate while inhibiting the operations of the software module J. The mapping J permits only the software module A and the software module J to operate while inhibiting the operations of the software module F.

A state transition occurs from the mapping A to the mapping F or from the mapping A to the mapping J. Conversely, a state transition may occur from the mapping F to the mapping A or from the mapping J to the mapping A. A direct state transition from the mapping F to the mapping J or conversely from the mapping J to the mapping F is inhibited.

Because the software module F and the software module J are inhibited from operating simultaneously as described above, security is ensured.

Incidentally, the mapping section 103 passes decisions on mappings in accordance with the destination (i.e., communication principle) of a received command packet. The software module A is always permitted to operate.

[Processes Performed when the Software Module F is Accessed]

FIG. 5 shows the processes performed when the reader/writer 11 gains access to the software module F.

In step S1, the reader/writer 11 transmits a command packet for the software module F. This command packet is received by the NFC chip 32 via the antennas 12 and 31 and forwarded to the software module A via the interface 51.

In step S21, the reception section 101 of the software module A receives the command packet destined for the software module F from the reader/writer 11. Since the mapping A is in a wait state, all modules except for the software module A are inhibited from communicating. Thus the reception process is performed only by the software module A. In step S22, upon receipt of the command packet destined for the software module F, the mapping section 103 of the software module A changes mapping states from the mapping A to the mapping F. This permits communication solely between the software module A and the software module F and inhibits all other communications.

In step S23, the transmission section 102 of the software module A receives the command packet destined for the software module F from the reader/writer 11 and transmits the received command packet to the software module F.

In step S41, the software module F receives the command packet from the software module A. The software module F then performs a process corresponding to the received command. In step S42, the software module F transmits to the software module A a response packet reflecting the result of the process and destined for the reader/writer 11 of the software module F.

In step S24, the reception section 101 of the software module A receives the response packet destined for the reader/writer 11 from the software module F. Thus in step S25, the mapping section 103 of the software module A changes mapping states from the mapping F to the mapping A. This permits only the software module A to communicate and inhibits all other communications. In step S26, the transmission section 102 of the software module A transmits to the reader/writer 11 the response packet received from the software module F and destined for the reader/writer 11. This response packet is transmitted to the reader/writer 11 via the interface 51, NFC chip 32, and antenna 31.

In step S2, the reader/writer 11 receives via the antenna 12 the response packet transmitted from the software module A and originated from the software module F. At this point, the response to the command transmitted to the software module F in step S1 is received from the software module F.

[Processes Performed when the Software Module J is Accessed]

Next, the processes performed when the reader/writer 11 gains access to the software module J will be explained below by reference to FIG. 6.

In step S61, the reader/writer 11 transmits a command packet for the software module J. This command packet is received by the NFC chip 32 via the antenna 12 and the antenna 31 and forwarded to the software module A via the interface 51.

In step S81, the reception section 101 of the software module A receives the command packet destined for the software module J from the reader/writer 11. Since the mapping A is in a wait state, all modules except for the software module A are inhibited from communicating. Thus the reception process is performed only by the software module A. In step S82, upon receipt of the command packet destined for the software module J, the mapping section 103 of the software module A changes mapping states from the mapping A to the mapping J. This permits communication solely between the software module A and the software module J and inhibits all other communications.

In step S83, the transmission section 102 of the software module A transmits to the software module J the command packet received from the reader/writer 11 and destined for the software module J.

In step S91, the software module J receives the command packet coming from the software module A. The software module J then performs a process corresponding to the received command. In step S92, the software module J transmits to the software module A a response packet reflecting the result of the process and destined for the reader/writer 11.

In step S84, the reception section 101 of the software module A receives the response packet originated from the software module J and destined for the reader/writer 11. Thus in step S85, the mapping section 103 of the software module A changes mapping states from the mapping J to the mapping A. This permits only the software module A to communicate and inhibits all other communications. In step S86, the transmission section 102 of the software module A transmits to the reader/writer 11 the response packet received from the software module J and destined for the reader/writer 11. This response packet is transmitted to the reader/writer 11 via the interface 51, NFC chip 32, and antenna 31.

In step S62, the reader/writer 11 receives via the antenna 12 the response packet transmitted from the software module A and originated from the software module J. At this point, the response to the command transmitted to the software module J in step S61 is received from the software module J.

[Processes Performed when the Software Module F and the Software Module J are Started]

Next, the processes performed when the reader/writer 11 communicates with the software module F via the software module J will be explained below by reference to FIGS. 7 and 8.

In step S111, the reader/writer 11 transmits a command for the software module F using a command packet of the software module J. This command packet is received by the NFC chip 32 via the antenna 12 and the antenna 31 and forwarded to the software module A via the interface 51.

In step S121, the reception section 101 of the software module A receives the command packet from the reader/writer 11. Since the mapping A is in a wait state, all modules except for the software module A are inhibited from communicating. Thus the reception process is performed only by the software module A. In step S122, upon receipt of the command packet for the software module J, the mapping section 103 of the software module A changes mapping states from the mapping A to the mapping J. This permits communication solely between the software module A and the software module J and inhibits all other communications.

In step S123, the transmission section 102 of the software module A transmits to the software module J the command for the software module F in the command packet of the software module J received from the reader/writer 11.

In step S151, the software module J receives the command packet coming from the software module A. Then in step S152, the software module J converts the packet. That is, since the command for the software module F is described in the command packet of the software module J, the packet for the software module J is converted to the packet for the software module F. In step S153, the software module J transmits to the software module A the command generated by the conversion and destined for the software module F via the software module J.

In step S124, the reception section 101 of the software module A receives the command packet coming from the software module J. In step S125, upon receipt of the command destined for the software module F via the software module J, the mapping section 103 of the software module A changes mapping states from the mapping J to the mapping A. This permits only the software module A to communicate and inhibits all other communications.

In step S126, the flag setting section 104 of the software module A sets a flag indicating that the command destined for the software module F via the software module J is received from the reader/writer 11. In step S127, upon receipt of the command destined for the software module F via the software module J, the mapping section 103 of the software module A changes mapping states from the mapping A to the mapping F. This permits communication solely between the software module A and the software module F and inhibits all other communications.

In step S128, the transmission section 102 of the software module A transmits to the software module F the command received from the software module J and destined for the software module F via the software module J.

In step S171, the software module F receives the command coming from the software module A and destined for the software module F via the software module J. The software module F then performs a process corresponding to the received command. In step S172, based on the result of the process, the software module F transmits its response to the software module A via the software module J.

In step S129, the reception section 101 of the software module A receives the response coming from the software F via the software module J.

In step S130, the mapping section 103 of the software module A changes mapping states from the mapping F to the mapping A in order to reset the flag. This permits only the software module A to communicate and inhibits all other communications.

In step S131, the flag setting section 104 of the software module A resets the flag. That is, because the flag has so far been set indicating that the command destined for the software module F via the software module J is received from the reader/writer 11, the flag setting section 104 of the software module A resets the flag in step S126 after verifying that the packet received from the software module J is transmitted to the reader/writer 11.

In step S132, the mapping section 103 of the software module A changes mapping states from the mapping A to the mapping J in order to transmit to the software module J the response received in step S129 from the software module F via the software module J. This permits communication between the software module A and the software module J and inhibits all other communications.

In step S133, the transmission section 102 of the software module A transmits to the software module J the response received in step S129 from the software module F via the software module J.

In step S154, the software module J receives the response packet coming from the software module A. In step S155, the software module J converts the packet. That is, the software module J converts the packet into the response from the software module F in the response packet of the software module J. In step S156, the software module J transmits to the software module A the response from the software module F in the response packet of the software module J.

In step S134, the reception section 101 of the software module A receives the response packet coming from the software module J. In step S135, the mapping section 103 of the software module A changes mapping states from the mapping J to the mapping A in order to communicate with the reader/writer 11 based on the flag. This permits only the software module A to communicate and inhibits all other communications. In step S136, the transmission section 102 of the software module A transmits to the reader/writer 11 the response packet received from the software module J in accordance with the flag verified prior to reset. This command packet is transmitted to the reader/writer 11 via the interface 51, NFC chip 32, and antenna 31.

In step S112, the reader/writer 11 receives via the antenna 12 the response of the software module F in the response packet of the software module J, the response having been transmitted from the software module A. At this point, the response corresponding to the command transmitted in step S111 using the command packet of the software module J and destined for the software module F is received from the software module F.

Whereas the foregoing description has explained the cases in which the reader/writer 11 accesses the software module F or software module J, the same processes are performed when the server 15 gains access to the portable communication terminal 13 via the portable terminal communication network 14. And the number of software modules operating on different principles should be at least two and may be three or more.

Also, the present embodiment may be applied to cases where the IC chip 34 is incorporated in a noncontact IC card or in some other information processing apparatus.

The series of the processes described above may be executed either by hardware or by software. Where the processes are to be carried out by software, the programs constituting the software may be either incorporated in the dedicated hardware of the computer to be installed from a suitable program recording medium into a general-purpose personal computer or like equipment capable of executing diverse functions based on the installed programs.

In this description, the steps describing the programs represent not only the processes that are to be carried out in the depicted sequence on a time series basis, but also processes that may be performed parallelly or individually and not necessarily chronologically.

In this description, the term "system" refers to an entire configuration made up of a plurality of component devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An IC chip comprising:
   a storage section configured to store map information about a plurality of operating system software modules for processing information exchanged in accordance with a plurality of different noncontact communication principles including at least a Java Card principle and a FeliCa principle,
   wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states;
   a mapping software module including a mapping section that performs mapping of said map information and controls timing such that the plurality of operating system software modules are inhibited from operating simultaneously based on said map information,
   wherein the mapping section is configured to perform transitions between the plurality of mapping states for permitting or inhibiting the operations of said plurality of operating system software modules based on the destinations of received packets, and
   wherein a direct transition from a first mapping state in which a first operating system software module is permitted to operate to a second mapping state in which a second operating system software module is permitted to operate is inhibited; and
   a memory access management module including a management section configured to manage the operations of said operating system software modules, including permitting or inhibiting operations of each of the plurality of operating system software modules based on said map information,
   wherein if one of said operating system software modules of which the operations are inhibited based on the map information operates, then the management section performs a hardware reset.

2. The IC chip according to claim 1, wherein the IC chip is configured to process command packets by:
   receiving, by the mapping software module, a command packet destined for one of the plurality of operating system software modules from a reader/writer;
   changing, by the mapping section, the map information to a mapping state in which only one of the plurality of operating system software modules is permitted to operate and all other operating system software modules are inhibited from operating based on the destination and corresponding noncontact communication principle of the received command packet;
   transmitting, by the mapping software module, the command packet to the corresponding operating system software module based on the map information;
   receiving, by the corresponding operating system software module, the command packet and performing a process based on the received command;
   transmitting, by the corresponding operating system software module, a response packet destined for the reader/writer and indicating a result of the process;
   receiving, by the mapping software module, the response packet;
   changing, by the mapping section, the map information to a mapping state in which all of the plurality of operating system software modules are inhibited from operating based on the destination and noncontact communication principle of the received response packet; and
   transmitting, by the mapping software module, the response packet to the reader/writer based on the map information.

3. The IC chip according to claim 1, wherein the IC chip is further configured to process command packets by:
   receiving, by the mapping software module, a command destined for the second operating system software module operating using the second noncontact communication principle using a command packet of the first operating system software module using the first noncontact communication principle from the reader/writer, wherein the first and second noncontact communication principles include Java Card and FeliCa, respectively,
   receiving, by the first operating system software module, the command packet from the mapping software module;
   converting, by the first operating system software module, the received command packet to a command packet of the second operating system software module;
   transmitting, by the first operating system software module, the converted command packet to the mapping software module;
   setting, by a flag setting section of the mapping software module, a flag indicating that the command destined for the second operating system software module has been received from the reader/writer via the first operating system software module;
   receiving, by the second operating system software module, the converted command packet from the mapping software module and performing a process based on the received command;
   transmitting, by the second operating system software module, a response packet destined for the reader/writer and indicating a result of the process to the mapping software module;
   receiving, by the first operating system software module, the response packet from the mapping software module;
   converting, by the first operating system software module, the received response packet to a response packet of the first operating system software module;
   transmitting, by the first operating system software module, the converted response packet to the mapping software module; and
   resetting, by the flag setting section, the flag after verifying that the converted response packet has been transmitted to the reader/writer via the first operating system software module.

4. A software module control method comprising:
   storing map information about a plurality of operating system software modules for processing information exchanged in accordance with a plurality of different noncontact communication principles including at least a Java Card principle and a FeliCa principle,
   wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states;
   performing mapping of said map information and controlling timing such that the plurality of operating system software modules are inhibited from operating simultaneously based on said map information;

performing transitions between the plurality of mapping states for permitting or inhibiting the operations of said plurality of operating system software modules based on the destinations of received packets, wherein a direct transition from a first mapping state in which a first operating system software module is permitted to operate to a second mapping state in which a second operating system software module is permitted to operate is inhibited; and managing the operations of said operating system software modules, including permitting or inhibiting operations of each of the plurality of operating system software modules based on said map information, wherein if one of said operating system software modules of which the operations are inhibited based on the map information operates, then the management section performs a hardware reset.

5. The software module control method according to claim 4, further comprising:

receiving a command packet destined for one of the plurality of operating system software modules from a reader/writer;

changing the map information to a mapping state in which only one of the plurality of operating system software modules is permitted to operate and all other operating system software modules are inhibited from operating based on the destination and corresponding noncontact communication principle of the received command packet;

transmitting the command packet to the corresponding operating system software module based on the map information;

receiving, by the corresponding operating system software module, the command packet and performing a process based on the received command;

transmitting, by the corresponding operating system software module, a response packet destined for the reader/writer and indicating a result of the process;

receiving the response packet;

changing the map information to a mapping state in which all of the plurality of operating system software modules are inhibited from operating based on the destination and noncontact communication principle of the received response packet; and transmitting the response packet to the reader/writer based on the map information.

6. The software module control method according to claim 4, further comprising:

receiving a command destined for the second operating system software module operating using the second noncontact communication principle using a command packet of the first operating system software module using the first noncontact communication principle from the reader/writer, wherein the first and second noncontact communication principles include Java Card and FeliCa, respectively;

receiving, by the first operating system software module, the command packet from the mapping software module;

converting, by the first operating system software module, the received command packet to a command packet of the second operating system software module;

transmitting, by the first operating system software module, the converted command packet to the mapping software module;

setting a flag indicating that the command destined for the second operating system software module has been received from the reader/writer via the first operating system software module;

receiving, by the second operating system software module, the converted command packet from the mapping software module and performing a process based on the received command;

transmitting, by the second operating system software module, a response packet destined for the reader/writer and indicating a result of the process to the mapping software module;

receiving, by the first operating system software module, the response packet from the mapping software module;

converting, by the first operating system software module, the received response packet to a response packet of the first operating system software module;

transmitting, by the first operating system software module, the converted response packet to the mapping software module; and resetting the flag after verifying that the converted response packet has been transmitted to the reader/writer via the first operating system software module.

7. A computer program product stored on a non-transitory computer readable medium including executable instructions that when executed by a processor perform steps for:

storing map information about a plurality of operating system software modules for processing information exchanged in accordance with a plurality of different noncontact communication principles including at least a Java Card principle and a FeliCa principle, wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states;

performing mapping of said map information and controlling timing such that the plurality of operating system software modules are inhibited from operating simultaneously based on said map information;

performing transitions between the plurality of mapping states for permitting or inhibiting the operations of said plurality of operating system software modules based on the destinations of received packets, wherein a direct transition from a first mapping state in which a first operating system software module is permitted to operate to a second mapping state in which a second operating system software module is permitted to operate is inhibited; and managing the operations of said operating system software modules, including permitting or inhibiting operations of each of the plurality of operating system software modules based on said map information, wherein if one of said operating system software modules of which the operations are inhibited based on the map information operates, then the management section performs a hardware reset.

8. The computer program product stored on the non-transitory computer readable medium according to claim 7, further including executable instructions that when executed by a processor perform steps for:

receiving a command packet destined for one of the plurality of operating system software modules from a reader/writer;

changing the map information to a mapping state in which only one of the plurality of operating system software modules is permitted to operate and all other operating system software modules are inhibited from operating based on the destination and corresponding noncontact communication principle of the received command packet;

transmitting the command packet to the corresponding operating system software module based on the map information;

receiving, by the corresponding operating system software module, the command packet and performing a process based on the received command;

transmitting, by the corresponding operating system software module, a response packet destined for the reader/writer and indicating a result of the process;

receiving the response packet;

changing the map information to a mapping state in which all of the plurality of operating system software modules are inhibited from operating based on the destination and noncontact communication principle of the received response packet; and transmitting the response packet to the reader/writer based on the map information.

9. The computer program product stored on the non-transitory computer readable medium according to claim 7, further including executable instructions that when executed by a processor perform steps for:

receiving a command destined for the second operating system software module operating using the second noncontact communication principle using a command packet of the first operating system software module using the first noncontact communication principle from the reader/writer, wherein the first and second noncontact communication principles include Java Card and FeliCa, respectively, receiving, by the first operating system software module, the command packet from the mapping software module;

converting, by the first operating system software module, the received command packet to a command packet of the second operating system software module;

transmitting, by the first operating system software module, the converted command packet to the mapping software module;

setting a flag indicating that the command destined for the second operating system software module has been received from the reader/writer via the first operating system software module;

receiving, by the second operating system software module, the converted command packet from the mapping software module and performing a process based on the received command;

transmitting, by the second operating system software module, a response packet destined for the reader/writer and indicating a result of the process to the mapping software module;

receiving, by the first operating system software module, the response packet from the mapping software module;

converting, by the first operating system software module, the received response packet to a response packet of the first operating system software module;

transmitting, by the first operating system software module, the converted response packet to the mapping software module; and resetting the flag after verifying that the converted response packet has been transmitted to the reader/writer via the first operating system software module.

10. An information processing apparatus comprising:

a storage section configured to store map information about a plurality of operating system software modules for processing information exchanged in accordance with a plurality of different noncontact communication principles including at least a Java Card principle and a FeliCa principle, wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states;

a mapping software module including a mapping section that performs mapping of said map information and controls timing such that the plurality of operating system software modules are inhibited from operating simultaneously based on said map information, wherein the mapping section is configured to perform transitions between the plurality of mapping states for permitting or inhibiting the operations of said plurality of operating system software modules based on the destinations of received packets, and wherein a direct transition from a first mapping state in which a first operating system software module is permitted to operate to a second mapping state in which a second operating system software module is permitted to operate is inhibited; and a memory access management module including a management section configured to manage the operations of said operating system software modules, including permitting or inhibiting operations of each of the plurality of operating system software modules based on said map information, wherein if one of said operating system software modules of which the operations are inhibited based on the map information operates, then the management section performs a hardware reset.

11. The information processing apparatus according to claim 10, wherein said information processing apparatus is a portable communication terminal or a noncontact IC card.

12. The information processing apparatus according to claim 10, wherein the information processing apparatus is configured to process command packets by:

receiving, by the mapping software module, a command packet destined for one of the plurality of operating system software modules from a reader/writer;

changing, by the mapping section, the map information to a mapping state in which only one of the plurality of operating system software modules is permitted to operate and all other operating system software modules are inhibited from operating based on the destination and corresponding noncontact communication principle of the received command packet;

transmitting, by the mapping software module, the command packet to the corresponding operating system software module based on the map information;

receiving, by the corresponding operating system software module, the command packet and performing a process based on the received command;

transmitting, by the corresponding operating system software module, a response packet destined for the reader/writer and indicating a result of the process;
receiving, by the mapping software module, the response packet;
changing, by the mapping section, the map information to a mapping state in which all of the plurality of operating system software modules are inhibited from operating based on the destination and noncontact communication principle of the received response packet; and
transmitting, by the mapping software module, the response packet to the reader/writer based on the map information.

13. The information processing apparatus according to claim 10, wherein the information processing apparatus is further configured to process command packets by:
receiving, by the mapping software module, a command destined for the second operating system software module operating using the second noncontact communication principle using a command packet of the first operating system software module using the first noncontact communication principle from the reader/writer, wherein the first and second noncontact communication principles include Java Card and FeliCa, respectively;
receiving, by the first operating system software module, the command packet from the mapping software module;
converting, by the first operating system software module, the received command packet to a command packet of the second operating system software module;
transmitting, by the first operating system software module, the converted command packet to the mapping software module;
setting, by a flag setting section of the mapping software module, a flag indicating that the command destined for the second operating system software module has been received from the reader/writer via the first operating system software module;
receiving, by the second operating system software module, the converted command packet from the mapping software module and performing a process based on the received command;
transmitting, by the second operating system software module, a response packet destined for the reader/writer and indicating a result of the process to the mapping software module;
receiving, by the first operating system software module, the response packet from the mapping software module;
converting, by the first operating system software module, the received response packet to a response packet of the first operating system software module;
transmitting, by the first operating system software module, the converted response packet to the mapping software module; and
resetting, by the flag setting section, the flag after verifying that the converted response packet has been transmitted to the reader/writer via the first operating system software module.

14. An information processing system comprising:
a first information processing apparatus; and
a second information processing apparatus accessed by said first information processing apparatus through near-field communication,
wherein said second information processing apparatus includes:
a storage section configured to store map information about a plurality of operating system software modules for processing information exchanged in accordance with a plurality of different noncontact communication principles including at least a Java Card principle and a FeliCa principle,
wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states;
a mapping software module including a mapping section that performs mapping of said map information and controls timing such that the plurality of operating system software modules are inhibited from operating simultaneously based on said map information,
wherein the mapping section is configured to perform transitions between the plurality of mapping states for permitting or inhibiting the operations of said plurality of operating system software modules based on the destinations of received packets, and
wherein a direct transition from a first mapping state in which a first operating system software module is permitted to operate to a second mapping state in which a second operating system software module is permitted to operate is inhibited; and
a memory access management module including a management section configured to manage the operations of said operating system software modules, including permitting or inhibiting operations of each of the plurality of operating system software modules based on said map information,
wherein if one of said operating system software modules of which the operations are inhibited based on the map information operates, then the management section performs a hardware reset.

15. The information processing system according to claim 14, wherein
said first information processing apparatus is a reader/writer or a server; and
said second information processing apparatus is a portable communication terminal or a noncontact IC card.

16. The information processing system according to claim 14, wherein the second information processing apparatus is configured to process command packets by:
receiving, by the mapping software module, a command packet destined for one of the plurality of operating system software modules from a reader/writer;
changing, by the mapping section, the map information to a mapping state in which only one of the plurality of operating system software modules is permitted to operate and all other operating system software modules are inhibited from operating based on the destination and corresponding noncontact communication principle of the received command packet;
transmitting, by the mapping software module, the command packet to the corresponding operating system software module based on the map information;
receiving, by the corresponding operating system software module, the command packet and performing a process based on the received command;
transmitting, by the corresponding operating system software module, a response packet destined for the reader/writer and indicating a result of the process;
receiving, by the mapping software module, the response packet;

changing, by the mapping section, the map information to a mapping state in which all of the plurality of operating system software modules are inhibited from operating based on the destination and noncontact communication principle of the received response packet; and transmitting, by the mapping software module, the response packet to the reader/writer based on the map information.

17. The information processing system according to claim 14, wherein the second information processing apparatus is further configured to process command packets by:

receiving, by the mapping software module, a command destined for the second operating system software module operating using the second noncontact communication principle using a command packet of the first operating system software module using the first noncontact communication principle from the reader/writer, wherein the first and second noncontact communication principles include Java Card and FeliCa, respectively, receiving, by the first operating system software module, the command packet from the mapping software module;

converting, by the first operating system software module, the received command packet to a command packet of the second operating system software module;

transmitting, by the first operating system software module, the converted command packet to the mapping software module;

setting, by a flag setting section of the mapping software module, a flag indicating that the command destined for the second operating system software module has been received from the reader/writer via the first operating system software module;

receiving, by the second operating system software module, the converted command packet from the mapping software module and performing a process based on the received command;

transmitting, by the second operating system software module, a response packet destined for the reader/writer and indicating a result of the process to the mapping software module;

receiving, by the first operating system software module, the response packet from the mapping software module;

converting, by the first operating system software module, the received response packet to a response packet of the first operating system software module;

transmitting, by the first operating system software module, the converted response packet to the mapping software module; and resetting, by the flag setting section, the flag after verifying that the converted response packet has been transmitted to the reader/writer via the first operating system software module.

18. An information processing method for use with an information processing system comprising:

a first information processing apparatus accessing a second information processing apparatus through near-field communication, wherein said second information processing apparatus is configured for:

storing map information about a plurality of operating system software modules for processing information exchanged in accordance with a plurality of different noncontact communication principles including at least a Java Card principle and a FeliCa principle, wherein the map information includes a plurality of mapping states, and for each one of the plurality of operating system software modules, the map information indicates which of the plurality of operating system software modules are permitted to operate and which of the plurality of operating system software modules are inhibited from operating in each of the plurality of mapping states, performing mapping of said map information and controlling timing such that the plurality of operating system software modules are inhibited from operating simultaneously based on said map information, performing transitions between the plurality of mapping states for permitting or inhibiting the operations of said plurality of operating system software modules based on the destinations of received packets, wherein a direct transition from a first mapping state in which a first operating system software module is permitted to operate to a second mapping state in which a second operating system software module is permitted to operate is inhibited, and managing the operations of said operating system software modules, including permitting or inhibiting operations of each of the plurality of operating system software modules based on said map information, wherein if one of said operating system software modules of which the operations are inhibited based on the map information operates, then the management section performs a hardware reset.

19. The information processing method according to claim 18, further comprising:

receiving a command packet destined for one of the plurality of operating system software modules from a reader/writer;

changing the map information to a mapping state in which only one of the plurality of operating system software modules is permitted to operate and all other operating system software modules are inhibited from operating based on the destination and corresponding noncontact communication principle of the received command packet;

transmitting the command packet to the corresponding operating system software module based on the map information;

receiving, by the corresponding operating system software module, the command packet and performing a process based on the received command;

transmitting, by the corresponding operating system software module, a response packet destined for the reader/writer and indicating a result of the process;

receiving the response packet;

changing the map information to a mapping state in which all of the plurality of operating system software modules are inhibited from operating based on the destination and noncontact communication principle of the received response packet; and transmitting the response packet to the reader/writer based on the map information.

20. The information processing method according to claim 18, further comprising:

receiving a command destined for the second operating system software module operating using the second noncontact communication principle using a command packet of the first operating system software module using the first noncontact communication principle from the reader/writer, wherein the first and second noncontact communication principles include Java Card and FeliCa, respectively, receiving, by the first operating system software module, the command packet from the mapping software module;

converting, by the first operating system software module, the received command packet to a command packet of the second operating system software module;

transmitting, by the first operating system software module, the converted command packet to the mapping software module;

setting a flag indicating that the command destined for the second operating system software module has been received from the reader/writer via the first operating system software module;

receiving, by the second operating system software module, the converted command packet from the mapping software module and performing a process based on the received command;

transmitting, by the second operating system software module, a response packet destined for the reader/writer and indicating a result of the process to the mapping software module;

receiving, by the first operating system software module, the response packet from the mapping software module;

converting, by the first operating system software module, the received response packet to a response packet of the first operating system software module;

transmitting, by the first operating system software module, the converted response packet to the mapping software module; and resetting the flag after verifying that the converted response packet has been transmitted to the reader/writer via the first operating system software module.

* * * * *